United States Patent
Kwon et al.

(10) Patent No.: US 11,418,709 B2
(45) Date of Patent: Aug. 16, 2022

(54) CAMERA MODULES AND RELATED OPERATING METHODS AND ELECTRONIC DEVICES

(71) Applicant: Samsung Electronics Co., Ltd., Suwon-si (KR)

(72) Inventors: Daechul Kwon, Suwon-si (KR); Jaehyuck Kang, Seongnam-si (KR); Gyeonghan Cha, Geoje-si (KR); Moo Young Kim, Suwon-si (KR)

(73) Assignee: Samsung Electronics Co., Ltd.

( * ) Notice: Subject to any disclaimer, the term of this patent is extended or adjusted under 35 U.S.C. 154(b) by 38 days.

(21) Appl. No.: 17/155,275

(22) Filed: Jan. 22, 2021

(65) Prior Publication Data

US 2021/0385372 A1    Dec. 9, 2021

(30) Foreign Application Priority Data

Jun. 8, 2020  (KR) .......................... 10-2020-0069036

(51) Int. Cl.
  *H04N 5/232* (2006.01)
  *H04N 5/225* (2006.01)

(52) U.S. Cl.
  CPC ....... *H04N 5/23227* (2018.08); *H04N 5/2258* (2013.01); *H04N 5/23229* (2013.01); *H04N 5/23241* (2013.01); *H04N 5/23245* (2013.01)

(58) Field of Classification Search
  CPC ............. H04N 5/23227; H04N 5/2258; H04N 5/23229; H04N 5/23241; H04N 5/23245; H04N 5/2251; H04N 5/2253; H04N 5/2257; H04N 5/3765; H04N 5/357; H04N 5/3698

See application file for complete search history.

(56) References Cited

U.S. PATENT DOCUMENTS

| | | | |
|---|---|---|---|
| 7,667,737 B2 | 2/2010 | Morimoto et al. | |
| 8,949,640 B2 | 2/2015 | Minami | |
| 9,690,725 B2 | 6/2017 | Sengoku | |
| 9,743,022 B2 | 8/2017 | Oh et al. | |
| 10,313,621 B2 | 6/2019 | Sasaki et al. | |
| 10,506,184 B2 | 12/2019 | Kato et al. | |
| 2009/0219429 A1* | 9/2009 | Ogura | H04N 5/378 348/308 |
| 2019/0237003 A1 | 8/2019 | Cao et al. | |

FOREIGN PATENT DOCUMENTS

JP    2009105852 A    5/2009

* cited by examiner

*Primary Examiner* — Timothy J Henn
(74) *Attorney, Agent, or Firm* — Myers Bigel, P.A.

(57) ABSTRACT

Disclosed is a camera module. The camera module includes an image sensor that captures an image of a target to generate first image data, outputs the first image data, and outputs an interval information signal; an image signal processor that receives the first image data, performs image processing on the first image data to generate second image data and outputs the second image data; and an interface circuit that receives the second image data and the interval information signal and outputs the second image data as third image data. The interface circuit adjusts a timing to output the third image data, based on the interval information signal.

20 Claims, 15 Drawing Sheets

CAMERA MODULES AND RELATED OPERATING METHODS AND ELECTRONIC DEVICES

CROSS-REFERENCE TO RELATED APPLICATION(S)

This application claims priority under 35 U.S.C. § 119 to Korean Patent Application No. 10-2020-0069036, filed on Jun. 8, 2020, in the Korean Intellectual Property Office, the disclosure of which is incorporated by reference herein in its entirety.

BACKGROUND

The present disclosure relates to semiconductor devices and, more particularly, to camera modules. A camera module may generate image data indicating a target and/or scenery that corresponds to the target. As performance of mobile devices, such as a smartphone and a smart tablet/pad, improves, camera (i.e., image) modules may be increasingly used in the mobile devices. Because the image modules used in the mobile devices generate image data, the image modules may be used to create image-based content.

To generate image data having an improved quality, various technologies for canceling, suppressing, or compensating for various instances of noise occurring in the process of generating the image data may be applied to the camera modules or a processor (e.g., an application processor) receiving the image data from the camera modules. Conventional technologies, however, fail to present a solution to all instances of noise.

SUMMARY

Embodiments of the inventive concept provide a camera module canceling noise occurring at image data due to an operation of an interface circuit, an operating method of the camera module, and an electronic device including the camera module.

According to an example embodiment, a camera module includes an image sensor that captures an image of a target to generate first image data, outputs the first image data, and outputs an interval information signal, an image signal processor that receives the first image data, to perform image processing on the first image data to generate second image data and outputs the second image data, and an interface circuit that receives the second image data and the interval information signal and outputs the second image data as third image data. The interface circuit adjusts a timing to output the third image data, based on the interval information signal.

According to an example embodiment, an operating method of a camera module includes generating first image data by capturing an image of a target by using an image sensor of the camera module, outputting from the image sensor an interval information signal that identifies inhibit intervals, generating second image data by performing image processing on the first image data, starting to output the second image data as third image data while outside of the inhibit intervals, and ending an output of the third image data while outside of the inhibit intervals.

According to an example embodiment, an electronic device includes a camera module group that includes two or more camera modules each configured to capture an image of a target to generate image data, an application processor that independently controls the two or more camera modules of the camera module group and receives the image data from each of the two or more camera modules, and a power management integrated circuit that supplies power to the two or more camera modules of the camera module group in response to a control signal from the application processor. Each of the two or more camera modules includes an image sensor that captures the image of the target to generate first image data, outputs the first image data, and outputs an interval information signal, an image signal processor that receives the first image data, performs image processing on the first image data to generate second image data, and outputs the second image data, and an interface circuit that receives the second image data and the interval information signal and outputs the second image data as the image data. The interface circuit adjusts a timing to output the third image data, based on the interval information signal.

BRIEF DESCRIPTION OF THE FIGURES

The above and other objects and features of the inventive concept will become apparent by describing in detail example embodiments thereof with reference to the accompanying drawings.

DETAILED DESCRIPTION

Below, embodiments of the inventive concept may be described in detail and clearly to such an extent that one of ordinary skill in the art can implement the inventive concept.

Figure 1:
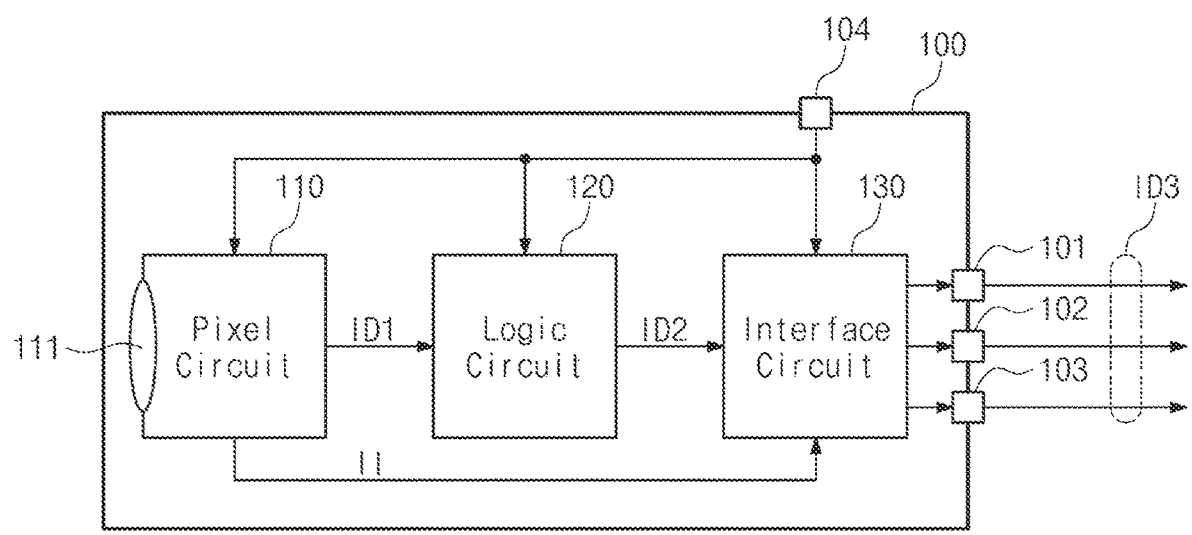
FIG. 1 illustrates a camera module according to an embodiment of the inventive concept.

FIG. 1 illustrates a camera module 100 according to an embodiment of the inventive concept. Referring to FIG. 1, the camera module 100 may include an image sensor 110, an image signal processor 120, an interface circuit 130, and first to fourth connectors 101 to 104.

The first to third connectors 101 to 103 may be used for the camera module 100 to output image data, for example, third image data ID3 to an external device (e.g., an application processor). The fourth connector 104 may be used to supply power including a voltage and a current to the image sensor 110, the image signal processor 120, and the interface circuit 130. As used herein, the term "connector" may mean a component that is used to output a voltage, a current, a signal, etc. to the external device or to receive a voltage, a current, a signal, etc. from the external device. The term "connector" may be interchanged with any other terms that have similar meanings, such as a pad and a terminal.

The image sensor 110 may include a lens 111. The image sensor 110 may capture an image of a target by using the lens 111. For example, the image sensor 110 may capture the image of the target by capturing the intensity of light that is incident through the lens 111 after being reflected from the target. The image sensor 110 may output the captured image as first image data ID1.

The image sensor 110 may further output an interval information signal II. The interval information signal II may include information about at least one interval (or period) during which the image sensor 110 performs sensing. For example, the interval information signal II may include information about at least one interval of time when noise is capable of being added to the first image data ID1 of the image sensor 110 due to a transient change of a voltage or a current of a power system such as a peak current.

The image signal processor 120 may receive the first image data ID1 from the image sensor 110. The image signal processor 120 may perform image processing on the first image data ID1. For example, the image processing may include a plurality of types of processing, such as noise canceling, white balancing, format conversion, compression, and target recognition. The format conversion may include converting image data based on a Bayer pattern or a non-Bayer pattern (e.g., tetra or nona) to RGB-based image data. The image signal processor 120 may output a result of the image processing as second image data ID2.

The interface circuit 130 may receive the second image data ID2 from the image signal processor 120. The interface circuit 130 may store the second image data ID2. The interface circuit 130 may further receive the interval information signal II from the image sensor 110. The interface circuit 130 may output the second image data ID2 as the third image data ID3, based on the interval information signal II.

For example, the interface circuit 130 may perform an operation of causing a transient change at a voltage or a current of a power system, in a state of being out of at least one interval that the interval information signal II indicates. For example, the interface circuit 130 may perform a start and an end of an output of the third image data ID3 in a state of being out of at least one interval known by the interval information signal II (e.g., on the basis of time).

That is, the image sensor 110 and the interface circuit 130 may prevent, cancel, or suppress noise capable of occurring due to a transient change of a voltage and a current of a power system. As the interface circuit 130 operates in response to the interval information signal II from the image sensor 110, the quality of the third image data ID3 that the camera module 100 outputs may be improved.

In an embodiment, the interface circuit 130 may output the third image data ID3 through the first to third connectors 101 to 103 in compliance with the C-PHY standard defined by the MIPI (Mobile Industry Processor Interface). However, a scheme where the interface circuit 130 outputs the third image data ID3 is not limited to the C-PHY.

Figure 2:
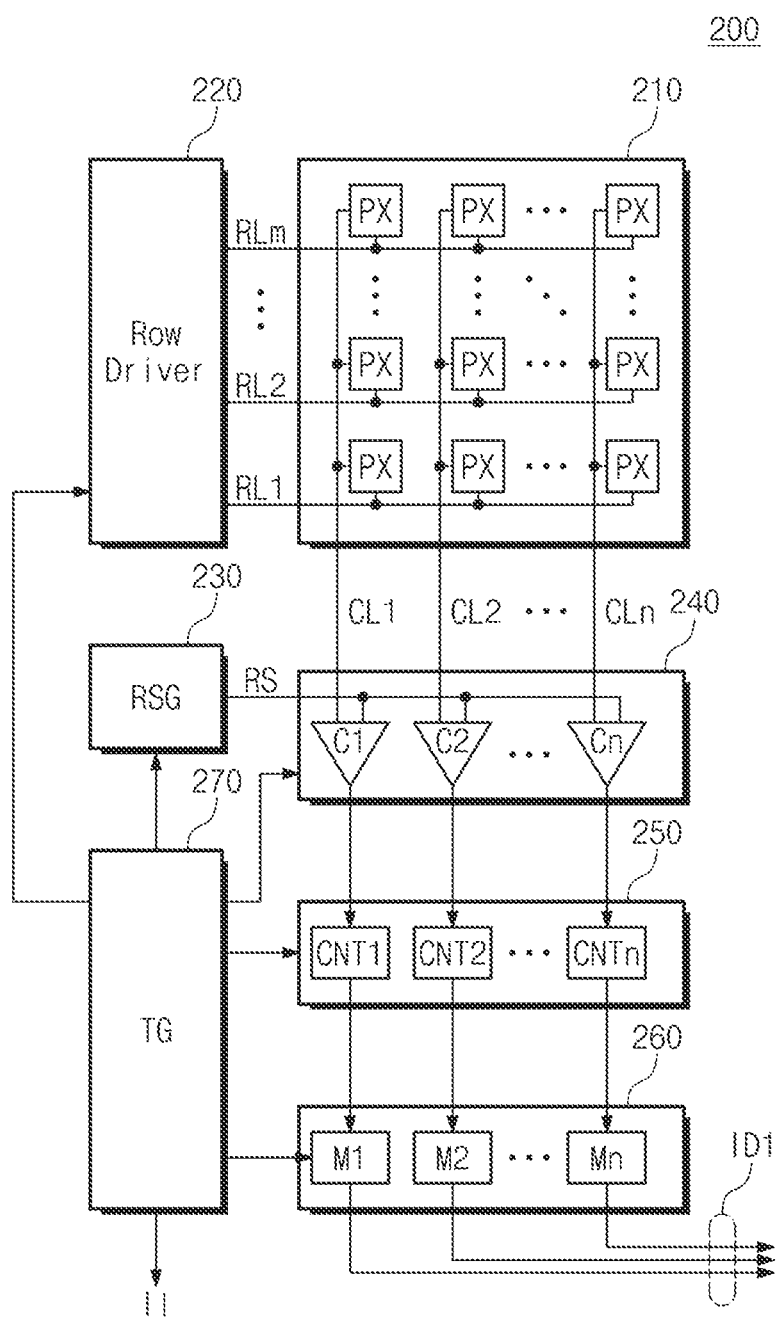
FIG. 2 illustrates an image sensor according to an embodiment of the inventive concept.

FIG. 2 illustrates an image sensor 200 according to an embodiment of the inventive concept. The image sensor 200 of FIG. 2 may correspond to the image sensor 110 of FIG. 1. Referring to FIGS. 1 and 2, the image sensor 200 may include a pixel array 210, a row driver 220, a ramp signal generator (RSG) 230, a comparator group 240, a counter group 250, a memory group 260, and a timing generator (TG) 270.

The pixel array 210 may include a plurality of pixels PX arranged along rows and columns in the form of a matrix. Each of the plurality of pixels PX may include a photoelectric conversion element. For example, the photoelectric conversion element may include a photo diode, a photo transistor, a photo gate, a pinned photo diode, etc. Each of the plurality of pixels PX may sense light by using the photoelectric conversion element and may convert the amount of the sensed light to an electrical signal, for example, a voltage or a current.

The plurality of pixels PX may be divided into a plurality of pixel groups. Each pixel group may include at least two or more pixels PX. In an embodiment, a pixel group may include pixels PX arranged in two rows and two columns or in three rows and three columns. Pixels PX constituting a pixel group may share at least one floating diffusion node (or floating diffusion region).

A color filter array may be interposed between the pixel array 210 and the lens 111. The color filter array may include red (R) filters, green (G) filters, and blue (B) filters. A pixel group may correspond to color filters of the same color. For example, a pixel group may include a red (R) pixel PX to convert light of a red spectrum into an electrical signal, a green (Gr or Gb) pixel PX to convert light of a green spectrum into an electrical signal, or a blue (B) pixel PX to convert light of a blue spectrum into an electrical signal, together with a filter of the color filter array. For example, the filters of the color filter array on the pixel array 210 may be arranged in the form of a Bayer pattern or in the form of a non-Bayer pattern.

The row driver 220 may be connected with rows of the pixels PX of the pixel array 210 through first to m-th row lines RL1 to RLm (m being a positive integer). The row driver 220 may decode an address and/or a control signal generated by the timing generator 270. Depending on a result of the decoding, the row driver 220 may sequentially drive the first to m-th row lines RL1 to RLm of the pixel array 210 and may drive a selected row line with a specific voltage. For example, the row driver 220 may drive a selected row line with a voltage appropriate for sensing light.

Each of the first to m-th row lines RL1 to RLm respectively connected with the rows of the pixels PX may include two or more lines. The two or more lines may include, for example, a signal for selecting a pixel PX, a signal for resetting a floating diffusion region, a signal for selecting a column line, etc.

The ramp signal generator 230 may generate a ramp signal RS. The ramp signal generator 230 may operate under control of the timing generator 270. For example, the ramp signal generator 230 may operate in response to a control signal such as a ramp enable signal or a mode signal. When the ramp enable signal is activated, the ramp signal generator 230 may generate the ramp signal RS having a slope that is set based on the mode signal. For example, the ramp signal generator 230 may generate the ramp signal RS that consistently (i.e., monotonically/continuously) decreases or increases from an initial level over time.

The comparator group 240 may be connected with columns of the pixels PX of the pixel array 210 through first to n-th column lines CL1 to CLn (n being a positive integer). The comparator group 240 may include first to n-th comparators C1 to Cn respectively connected with the first to n-th column lines CL1 to CLn. The first to n-th comparators C1 to Cn may receive the ramp signal RS from the ramp signal generator 230 in common (i.e., by a shared connection).

The first to n-th comparators C1 to Cn may compare voltages (or currents) of the first to n-th column lines CL1 to CLn with the ramp signal RS. When the ramp signal RS consistently decreasing (or increasing) becomes smaller (or greater) than voltages (or currents) of the first to n-th comparators C1 to Cn, each of the first to n-th comparators C1 to Cn may invert an output signal. That is, the first to n-th comparators C1 to Cn may output results of comparing magnitudes (or amounts) of voltages (or currents) output from the pixels PX to the first to n-th column lines CL1 to CLn with the ramp signal RS.

The counter group 250 may include first to n-th counters CNT1 to CNTn respectively receiving output signals of the first to n-th comparators C1 to Cn. The first to n-th counters CNT1 to CNTn may start a count operation at the same time, for example, when, before, or after the ramp signal RS starts to decrease (or increase). The first to n-th counters CNT1 to CNTn may stop the count operation when output signals of the first to n-th comparators C1 to Cn are inverted. For example, each of the first to n-th counters CNT1 to CNTn may stop the count operation when an output signal of the corresponding comparator among the first to n-th comparators C1 to Cn is inverted.

That is, the first to n-th comparators C1 to Cn may measure magnitudes of voltages (or currents) of the first to n-th column lines CL1 to CLn by using the ramp signal RS, and the first to n-th counters CNT1 to CNTn may convert the measured results to digital values.

First to n-th memories M1 to Mn of the memory group 260 may include first to n-th memories M1 to Mn respectively receiving output signals of the first to n-th counters CNT1 to CNTn. The first to n-th memories M1 to Mn may store the received output signals and may output the stored signals as the first image data ID1. For example, the first to n-th memories M1 to Mn may include latches.

The timing generator 270 may control timings at which the image sensor 200 operates. The timing generator 270 may control timings at which the row driver 220 sequentially selects the first to m-th row lines RL1 to RLm and may control timings at which signals are transferred through two or more lines included in a row line selected from the first to m-th row lines RL1 to RLm.

The timing generator 270 may control timings at which the ramp signal generator 230 generates the ramp signal RS and initializes/outputs the ramp signal RS. The timing generator 270 may control timings at which the first to n-th comparators C1 to Cn start a comparison operation and the first to n-th comparators C1 to Cn are initialized.

The timing generator 270 may control timings at which the first to n-th counters CNT1 to CNTn start a count operation and the first to n-th counters CNT1 to CNTn are initialized. The timing generator 270 may control timings at which the first to n-th memories M1 to Mn output the first image data ID1 and the first to n-th memories M1 to Mn are initialized.

Although not described above, the timing generator 270 may be configured to control various timings of various components necessary for the image sensor 200 to capture an image of a target and to output the captured image as the first image data ID1.

Figure 3:
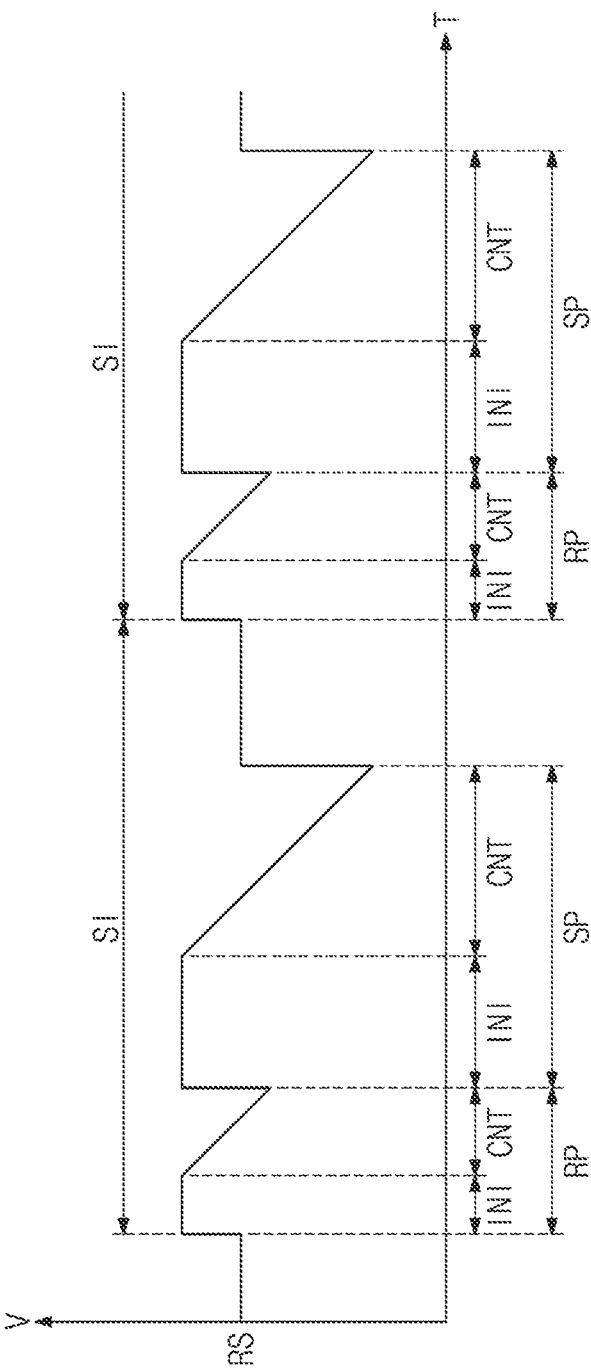
FIG. 3 illustrates an example of a sensing interval of an image sensor of FIG. 2.

FIG. 3 illustrates an example of a sensing interval SI of the image sensor 200 of FIG. 2. In FIG. 3, a horizontal axis represents a time "T", and a vertical axis represents a voltage "V". In an embodiment, a change of a voltage of the ramp signal RS over a time "T" is illustrated in FIG. 3.

Referring to FIGS. 2 and 3, the sensing interval SI may be an interval in which one row line is selected from the first to m-th row lines RL1 to RLm of the pixels PX of the pixel array 210 belonging to the image sensor 200 and data sensed by the pixels PX of the selected row line are output as the first image data ID1. The selection of the row line and the receipt of sensed data therefrom may collectively be referred to herein as a "scan" by the image sensor 200.

The sensing interval SI may include a reset phase RP and a signal phase SP. In the reset phase RP, the image sensor 200 may detect internal noise. The reset phase RP may include initialization INI and count CNT.

In the initialization INI of the reset phase RP, the first to n-th comparators C1 to Cn, the first to n-th counters CNT1 to CNTn, and the first to n-th memories M1 to Mn may be initialized. In the count CNT of the reset phase RP, the ramp signal generator 230 may consistently decrease the ramp signal RS.

In the count CNT of the reset phase RP, the first to n-th column lines CL1 to CLn may have initialized voltages (or currents). The first to n-th comparators C1 to Cn may compare noise of the initialized voltages (or currents) present on the first to n-th column lines CL1 to CLn with the ramp signal RS.

In the count CNT of the reset phase RP, the first to n-th counters CNT1 to CNTn may count output signals of the first to n-th comparators C1 to Cn, in which noise of the first to n-th comparators C1 to Cn, for example, DC offsets or gains thereof are included, in addition to the noise sensed by the first to n-th comparators C1 to Cn. That is, in the reset phase RP, noise of the first to n-th column lines CL1 to CLn and the first to n-th comparators C1 to Cn may be measured by the first to n-th counters CNT1 to CNTn as count values. The count values may be respectively stored in the first to n-th memories M1 to Mn.

The signal phase SP may include initialization INI and count CNT. In the initialization INI of the signal phase SP, the first to n-th comparators C1 to Cn, the first to n-th counters CNT1 to CNTn, and the first to n-th memories M1 to Mn may be initialized. In the initialization INI of the signal phase SP, the pixels PX of a row line selected from the first to m-th row lines RL1 to RLm may convert the amount of light received from outside of the image sensor 200 to voltages (or currents). For example, the voltages (or currents) may be stored at a floating diffusion node.

In the count CNT of the signal phase SP, the ramp signal generator 230 may consistently decrease the ramp signal RS. In the count CNT of the signal phase SP, the pixels PX of the selected row line may output voltages (or currents) corresponding to the sensed light amount to the first to n-th column lines CL1 to CLn.

In the count CNT of the signal phase SP, the first to n-th comparators C1 to Cn may respectively compare the voltages (or currents) of the first to n-th column lines CL1 to CLn with the ramp signal RS. The first to n-th counters CNT1 to CNTn may respectively count output signals of the first to n-th comparators C1 to Cn.

After the count CNT is completed, the count values may be respectively stored in the first to n-th memories M1 to Mn. The count values of the reset phase RP may be subtracted from the count values of the signal phase SP stored in the first to n-th memories M1 to Mn. That is, noise may be removed. Results of the subtraction may be output as the first image data ID1.

The image sensor 200 may repeatedly perform the sensing interval SI. For example, the image sensor 200 may perform the sensing interval SI while sequentially selecting the first to m-th row lines RL1 to RLm. The start and the end of the sensing interval SI are illustrated in detail in FIG. 3. However, the sensing interval SI may vary depending on the implementation of the image sensor 200.

For example, as illustrated in FIG. 3, the sensing interval SI may include one reset phase RP and one signal phase SP. For another example, the sensing interval SI may be modified to include two reset phases and two signal phases.

Figure 4:
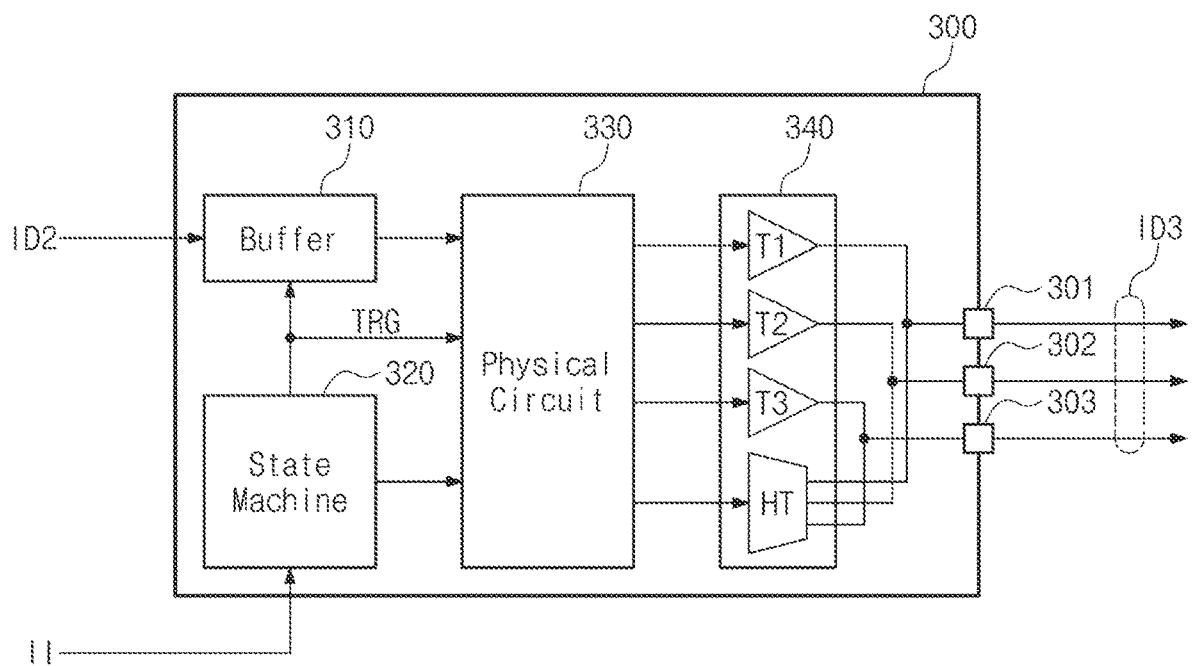
FIG. 4 illustrates an example of an interface circuit according to an embodiment of the inventive concept.

FIG. 4 illustrates an example of an interface circuit 300 according to an embodiment of the inventive concept. In an embodiment, the interface circuit 300 may correspond to the interface circuit 130 of FIG. 1. Referring to FIGS. 1 and 4, the interface circuit 300 may include first to third connectors 301 to 303, a buffer 310, a state machine 320, a physical circuit 330, and a transmitter group 340.

The first to third connectors 301 to 303 may correspond to the first to third connectors 101 to 103 of FIG. 1, respectively. The buffer 310 may receive the second image data ID2 output from the image signal processor 120. The buffer 310 may store the second image data ID2. For example, the buffer 310 may be a line buffer that stores the second image data ID2 in units of a line (e.g., a row). The buffer 310 may be configured to store data of at least two lines.

The state machine 320 may receive the interval information signal II from the image sensor 110. The state machine 320 may activate a trigger signal TRG such that a transient change of a voltage or a current does not occur when data of at least one line are stored in the buffer 310 and in at least one interval that the interval information signal II indicates.

For example, the buffer 310 may output data of one line to the physical circuit 330 in response to the trigger signal TRG. Alternatively, the physical circuit 330 may read data of one line from the buffer 310 in response to the trigger signal TRG. An example is illustrated in FIG. 4 as the trigger signal TRG is transferred to both the buffer 310 and the physical circuit 330, but the trigger signal TRG may be transferred to one of the buffer 310 and the physical circuit 330.

The physical circuit 330 may receive data of one line from the buffer 310. The physical circuit 330 may encode data of one line in the form of being appropriate for transmission. For example, the physical circuit 330 may encode data of one line in compliance with the C-PHY defined by the MIPI. The physical circuit 330 may drive the transmitter group 340 based on the encoded data.

The transmitter group 340 may include first to third transmitters T1 to T3 and a high-speed transmitter HT. The first to third transmitters T1 to T3 may be respectively connected with the first to third connectors 301 to 303. The high-speed transmitter HT may have three outputs respectively connected with the first to third connectors 301 to 303.

Figure 5:
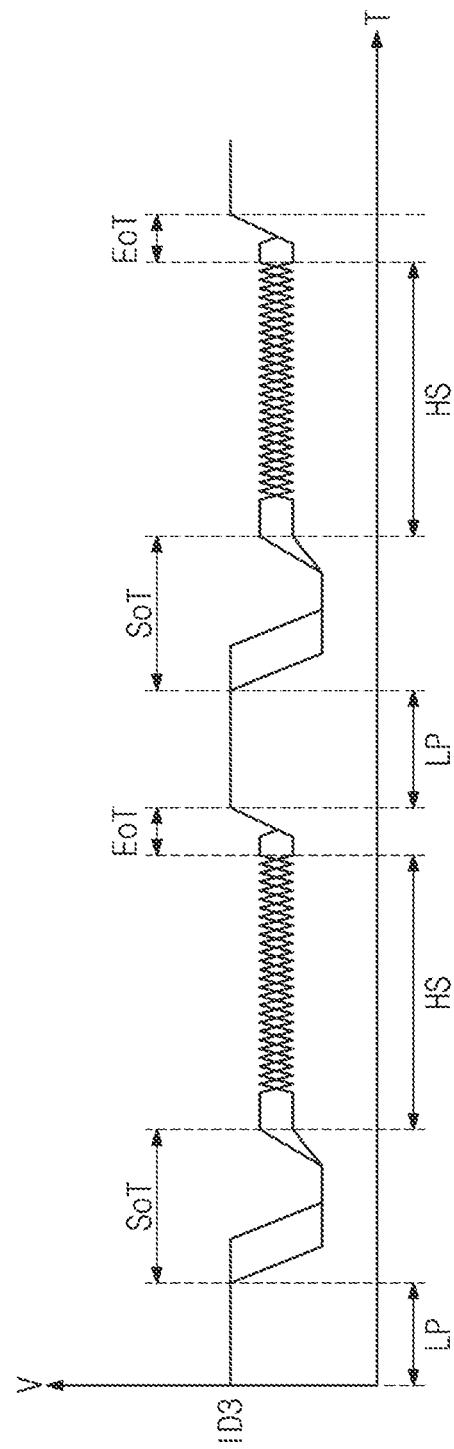
FIG. 5 illustrates an example in which an interface circuit outputs third image data.

The first to third transmitters T1 to T3 may perform low-power transmission in a low-power interval of a low-power mode LP (FIG. 5). In some embodiments, the low-power interval of the low-power mode LP may also be a low-speed transmission interval. The high-speed transmitter HT may perform high-speed transmission in a high-speed transmission interval of a high-speed transmission mode HS (FIG. 5). The first to third transmitters T1 to T3 and the high-speed transmitter HT may perform low-power transmission and high-speed transmission in compliance with the C-PHY defined by the MIPI.

FIG. 5 illustrates an example in which the interface circuit 300 outputs the third image data ID3. In FIG. 5, a horizontal axis represents a time "T", and a vertical axis represents an example of a signal that is output as the third image data ID3. Referring to FIGS. 1, 4, and 5, the interface circuit 300 may output the third image data ID3 in the high-speed transmission mode HS.

Initially, the interface circuit 300 may be in the low-power mode LP. When data of at least one line are stored in the buffer 310, the interface circuit 300 may enter the high-speed transmission mode HS and may output the data of the one line as the third image data ID3 through the high-speed transmission. Afterwards, the interface circuit 300 may again enter the low-power mode LP.

The interface circuit 300 may repeat the low-power mode LP and the high-speed transmission mode HS to output the third image data ID3 of a line unit. When the interface circuit 300 enters the high-speed transmission mode HS from the low-power mode LP, a transmission start interval of a start of transmission SoT may be present between the low-power mode LP and the high-speed transmission mode HS. When the interface circuit 300 enters the low-power mode LP from the high-speed transmission mode HS, a transmission end interval of an end of transmission EoT may be present between the high-speed transmission mode HS and the low-power mode LP.

In at least one of the start of transmission SoT or the end of transmission EoT, a transient change of a voltage or a current may occur. For example, in the start of transmission SoT where a switch from the low-power mode LP to the high-speed transmission mode HS is made, the amount of current consumed by the interface circuit 300 may suddenly increase. This may cause a peak current being a momentary increase (or decrease) in a current amount.

For example, in the end of transmission EoT where a switch from the high-speed transmission mode HS to the low-power mode LP is made, the amount of current consumed by the interface circuit 300 may suddenly decrease. This may cause a peak current being an instant decrease (or increase) in a current amount.

As illustrated in FIG. 1, the image sensor 110 and the interface circuit 130 are configured to receive power in common through the fourth connector 104. Accordingly, a peak current generated by the interface circuit 300 may be identically generated even at the image sensor 110.

Figure 6:
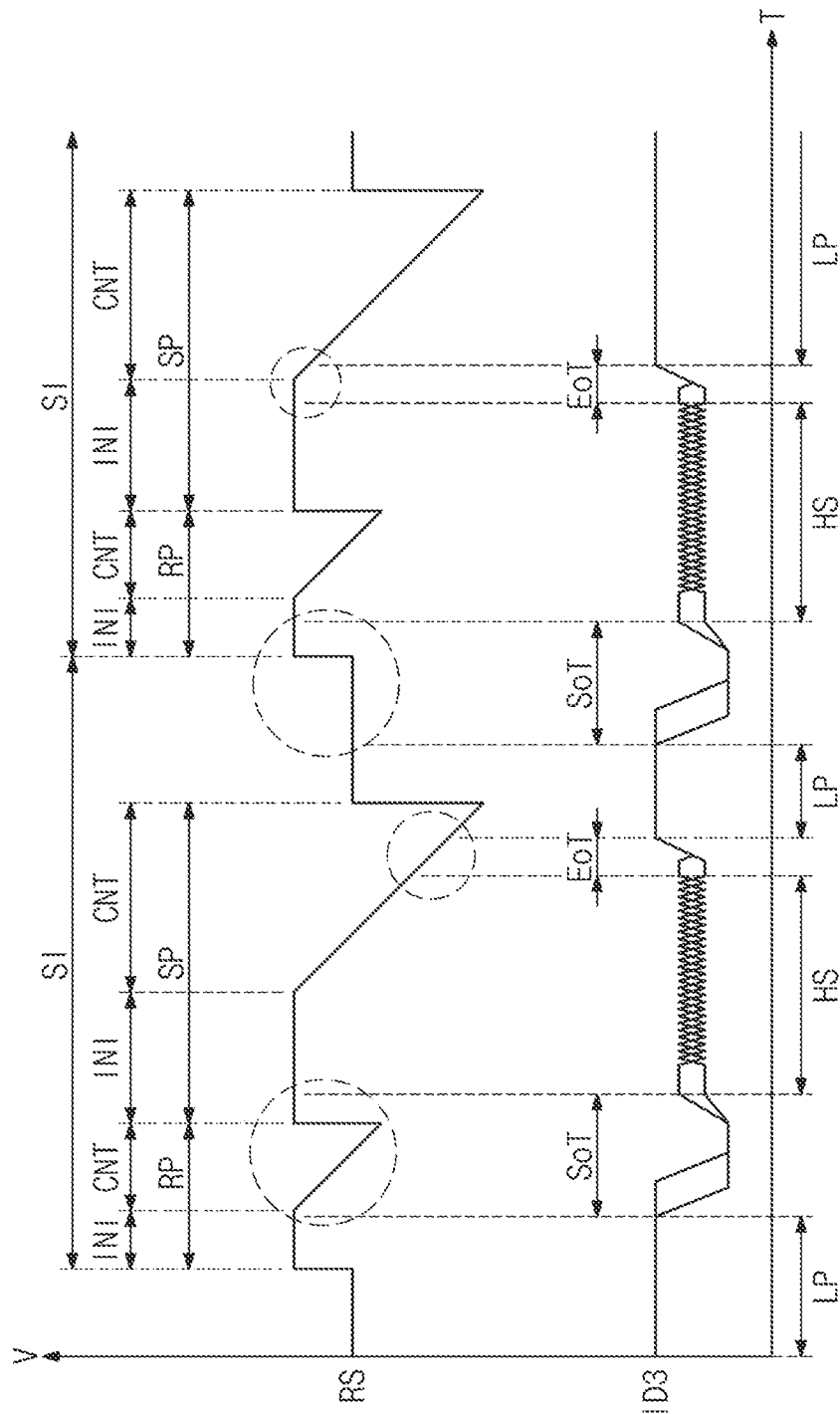
FIG. 6 illustrates a change of a ramp signal of an image sensor and an output of third image data together.

FIG. 6 illustrates a change of the ramp signal RS of the image sensor 110 and an output of the third image data ID3 together. In FIG. 6, a horizontal axis represents a time "T", and a vertical axis represents a voltage "V". The ramp signal RS and the output of the third image data ID3 are illustrated in FIG. 6. The ramp signal RS and the output of the third image data ID3 are together illustrated for better understanding, but a voltage "V" of the ramp signal RS and a voltage of the output of the third image data ID3 may be independent of each other.

Referring to FIGS. 1, 2, and 6, as marked by a dotted circle, the start of transmission SoT may be present in the count CNT of the reset phase RP belonging to a first sensing interval SI. Also, the end of transmission EoT may be present in the count CNT of the signal phase SP belonging to the first sensing interval SI. Also, the end of transmission EoT may be present in the initialization INI and the count CNT of the signal phase SP belonging to a second sensing interval SI.

The count CNT belonging to each of the reset phase RP and the signal phase SP may measure a magnitude of noise or a signal by using the ramp signal RS. When a peak current is generated in the count CNT, a peak may also be generated at a level of the ramp signal RS. That is, a peak noise may occur at the ramp signal RS in the process of measuring a magnitude of noise or a signal. The peak noise of the ramp signal RS may appear at (e.g., in) the third image data ID3, for example, in the form of a transverse stripe.

To prevent/suppress noise due to the peak current of the interface circuit 300, the image sensor 110 may output information about at least one interval (e.g., a time interval) where noise is capable of occurring due to the peak current during the sensing interval SI, as the interval information signal II. For example, the at least one interval may include at least a portion of an interval where the ramp signal RS consistently decreases (or increases).

The interface circuit 300 may inhibit an operation (e.g., the start of transmission SoT or the end of transmission EoT), which is capable of causing a peak current, during the at least one interval indicated by the interval information signal II and may perform the operation capable of causing the peak current in a state of being out of the at least one interval (on the basis of time).

Figure 7:
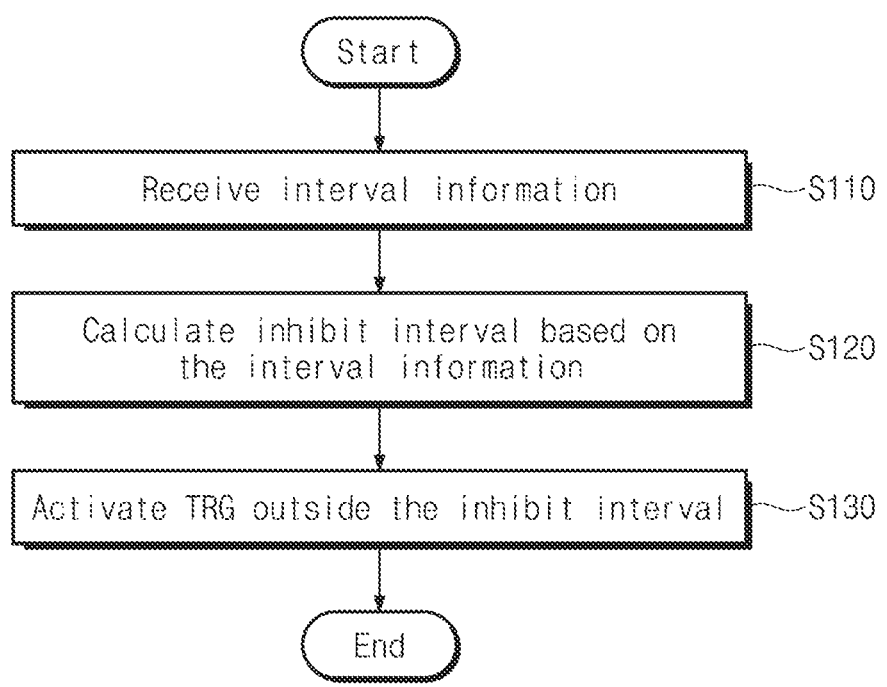
FIG. 7 illustrates an example of an operating method of an interface circuit.

FIG. 7 illustrates an example of an operating method of the interface circuit 300. Referring to FIGS. 1, 4, and 7, in operation S110, the interface circuit 300 may receive the interval information signal II from the image sensor 110. The interval information signal II may include information about at least one inhibit interval belonging to one sensing interval SI.

In operation S120, the interface circuit 300 may calculate the inhibit interval based on the interval information signal II. For example, the interface circuit 300 may calculate the inhibit interval in which the activation of the trigger signal TRG is inhibited, based on an operating characteristic of the interface circuit 300 and the information about the at least one interval indicated by the interval information signal II. For example, the interface circuit 300 may calculate the at least one inhibit interval in one sensing interval SI.

In operation S130, the interface circuit 300 may activate the trigger signal TRG in a state of being out of the inhibit interval. For example, after data of at least one line are stored in the buffer 310 and when a present interval is not the inhibit interval, the state machine 320 of the interface circuit 300 may activate the trigger signal TRG. In response to the trigger signal TRG, the buffer 310 and the physical circuit 330 of the interface circuit 300 may output the third image data ID3.

Figure 8:
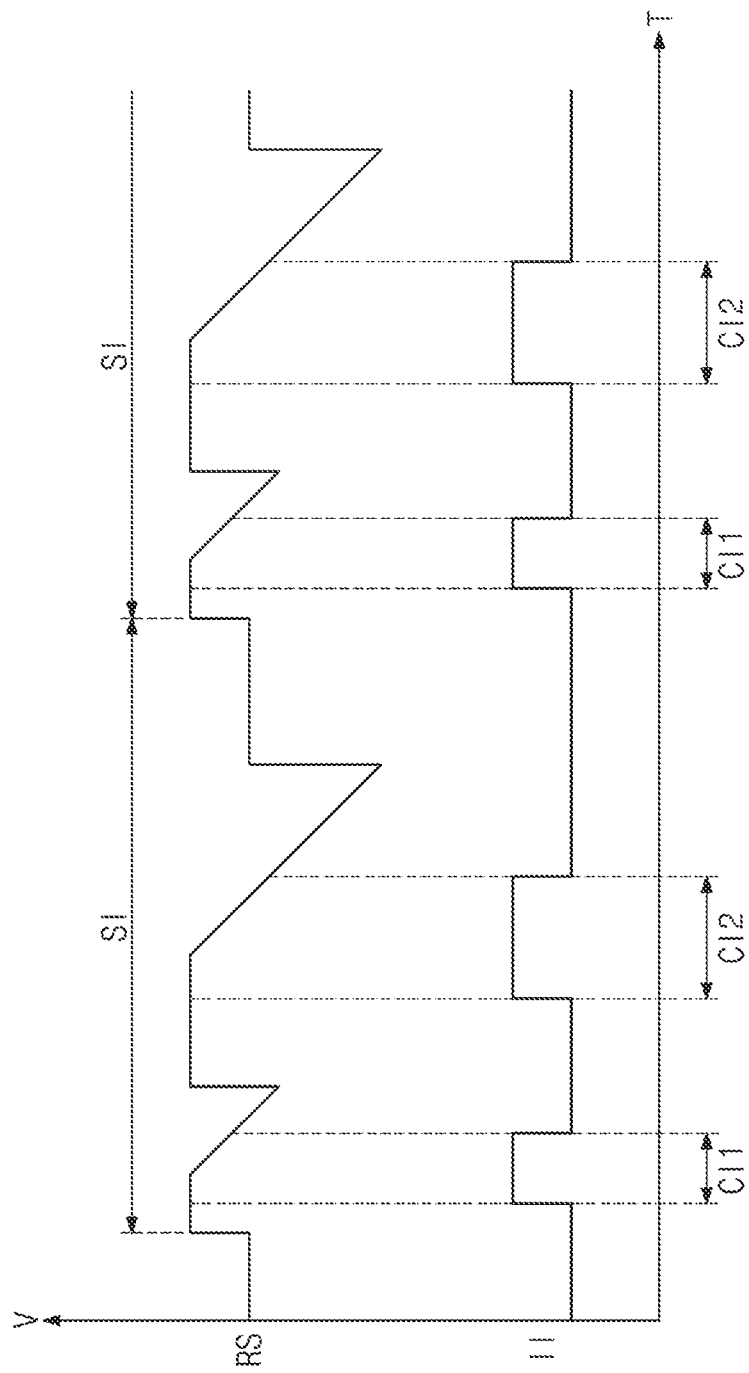
FIG. 8 illustrates an example of a ramp signal and an interval information signal.

FIG. 8 illustrates an example of the ramp signal RS and the interval information signal II. In FIG. 8, a horizontal axis represents a time "T", and a vertical axis represents a voltage "V". The ramp signal RS and the interval information signal II are illustrated in FIG. 8. The ramp signal RS and the interval information signal II are together illustrated for better understanding, but a voltage "V" of the ramp signal RS and a voltage of the interval information signal II may be independent of each other.

Referring to FIGS. 1, 2, and 8, the interval information signal II may include a first critical interval CI1 and a second critical interval CI2 in the sensing interval SI. The first critical interval CI1 may be associated with a first portion of the ramp signal RS that consistently decreases (or increases) in the reset phase RP. The second critical interval CI2 may be associated with a second portion of the ramp signal RS that consistently decreases (or increases) in the signal phase SP.

The image sensor 200 may inform the interface circuit 300 of the first critical interval CI1 and the second critical interval CI2 by setting the interval information signal II to a high level in the first critical interval CI1 and the second critical interval CI2. In an embodiment, locations of the first critical interval CI1 and the second critical interval CI2 in time may be determined depending on a structure and an operating feature of the image sensor 200. The first critical interval CI1 and the second critical interval CI2 illustrated in FIG. 8 are examples, and the inventive concept is not limited thereto.

In an embodiment, the timing generator 270 may control timings at which the interval information signal II transitions to the high level and timings at which the interval information signal II transitions to a low level. Timings at which the timing generator 270 controls the interval information signal II may be set to/for the image sensor 200 in the process of manufacturing the image sensor 200.

Figure 9:
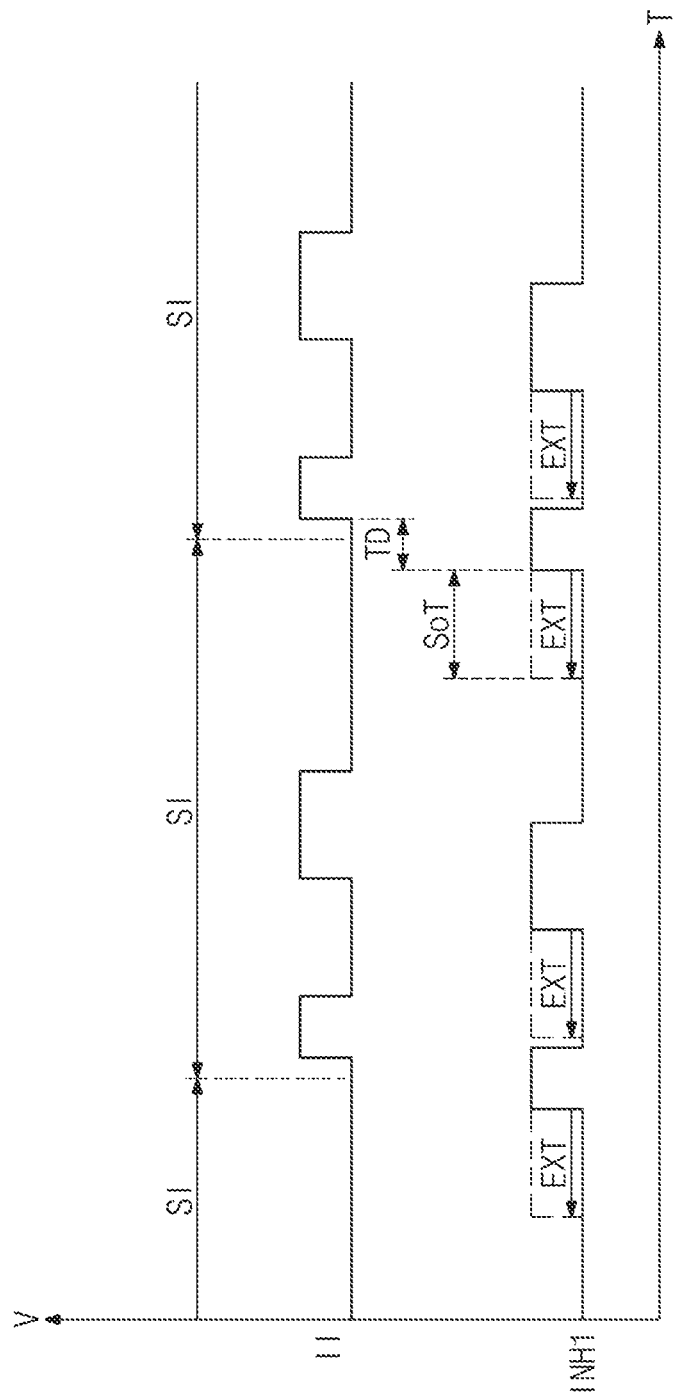
FIG. 9 illustrates an example in which an interface circuit calculates an inhibit interval based on a start of transmission.

FIG. 9 illustrates an example in which the interface circuit 300 calculates an inhibit interval based on the start of transmission SoT. In FIG. 9, a horizontal axis represents a time "T", and a vertical axis represents a voltage "V". A first inhibit interval signal INH1 and the interval information signal II are illustrated in FIG. 9. The first inhibit interval signal INH1 and the interval information signal II are together illustrated for better understanding, but a voltage "V" of the first inhibit interval signal INH1 and a voltage of the interval information signal II may be independent of each other.

Referring to FIGS. 1, 4, and 9, the image sensor 110 may control the interval information signal II as described with reference to FIG. 8. The interface circuit 300 may calculate an inhibit interval of the trigger signal TRG such that the start of transmission SoT does not exist during the high level of the interval information signal II.

The interface circuit 300 may apply a time from when the trigger signal TRG is activated to when the start of transmission SoT occurs at the transmitter group 340, to the inhibit interval as a transmission delay TD. For example, the interface circuit 300 may apply the transmission delay TD to the inhibit interval by calculating an intermediate signal advanced with respect to (i.e., occurring earlier in time than) the interval information signal II as much as the transmission delay TD.

Also, the interface circuit 300 may apply a time length of an interval of the start of transmission SoT to the inhibit interval by calculating the first inhibit interval signal INH1 extended (EXT) so as to be advanced with respect to the intermediate signal as much as the time length of the interval of the start of transmission SoT. In the case where the inhibit interval is set depending on the first inhibit interval signal INH1, the interface circuit 300 may avoid the occurrence of the start of transmission SoT for an output of the third image data ID3 during the high level of the interval information signal II.

Figure 10:
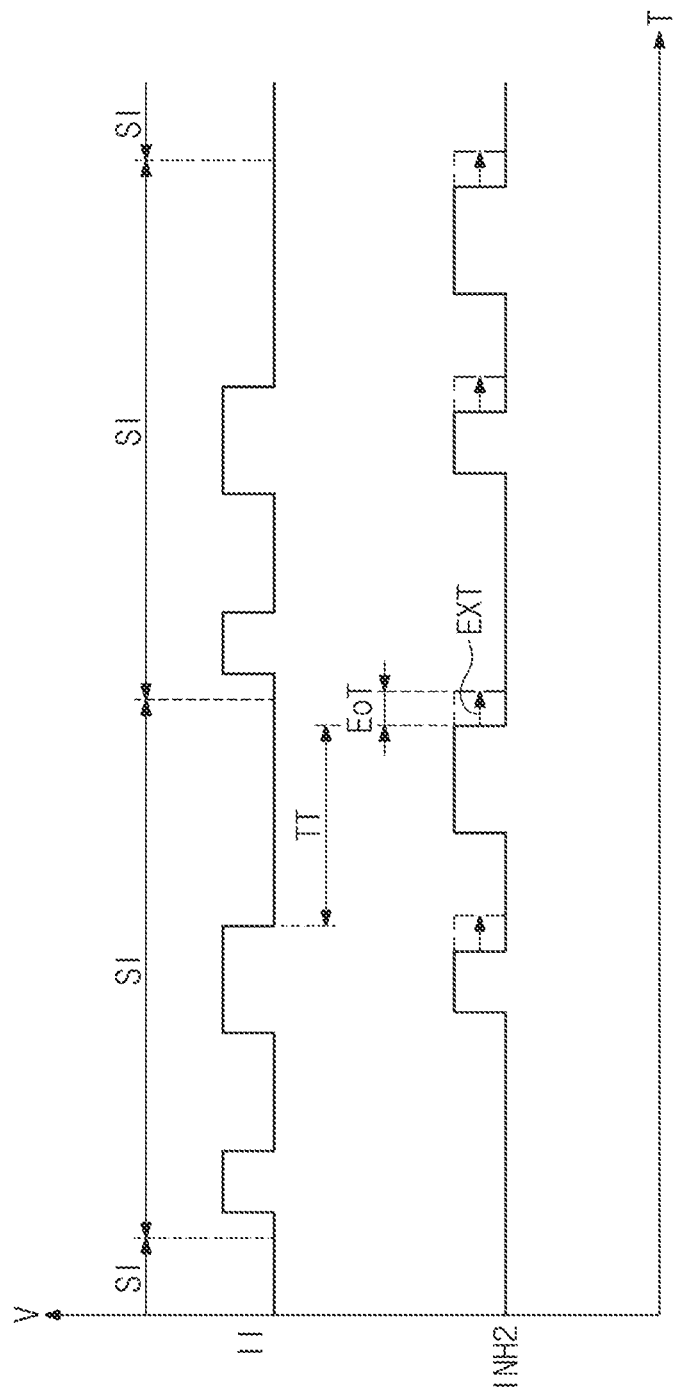
FIG. 10 illustrates an example in which an interface circuit calculates an inhibit interval based on an end of transmission.

FIG. 10 illustrates an example in which the interface circuit 300 calculates an inhibit interval based on the end of transmission EoT. In FIG. 10, a horizontal axis represents a time "T", and a vertical axis represents a voltage "V". A second inhibit interval signal INH2 and the interval information signal II are illustrated in FIG. 10. The second inhibit interval signal INH2 and the interval information signal II are together illustrated for better understanding, but a voltage "V" of the second inhibit interval signal INH2 and a voltage of the interval information signal II may be independent of each other.

Referring to FIGS. 1, 4, and 10, the image sensor 110 may control the interval information signal II as described with reference to FIG. 8. The interface circuit 300 may calculate an inhibit interval of the trigger signal TRG such that the end of transmission EoT does not exist during the high level of the interval information signal II.

As described above, the interface circuit 300 may output the third image data ID3 in units of a line. Accordingly, the amount of data that are output as the third image data ID3 between the start of transmission SoT and the end of transmission EoT may be uniform/fixed (e.g., line data). For example, each of a plurality of unique instances/occurrences of the high-speed transmission mode HS (FIG. 5) may output an equal amount of data. Accordingly, based on a frequency at which the third image data ID3 are output, the interface circuit 300 may calculate a time length of the high-speed transmission mode HS associated with the third image data ID3, that is, a time length of the high-speed transmission interval as a transmission time TT. The interface circuit 300 may apply, to the inhibit interval, a time from after the start of transmission SoT occurs to when the end of transmission EoT occurs, by calculating an intermediate signal delayed with respect to (i.e., starting after) the interval information signal II as much as the transmission time TT.

Also, the interface circuit 300 may apply a time length of an interval of the end of transmission EoT to the inhibit interval by calculating the second inhibit interval signal INH2 extended (EXT) so as to be delayed with respect to the intermediate signal as much as the time length of the interval of the end of transmission EoT. In the case where the inhibit interval is set depending on the second inhibit interval signal INH2, the interface circuit 300 may avoid the occurrence of the end of transmission EoT for an output of the third image data ID3 during the high level of the interval information signal II.

Figure 11:
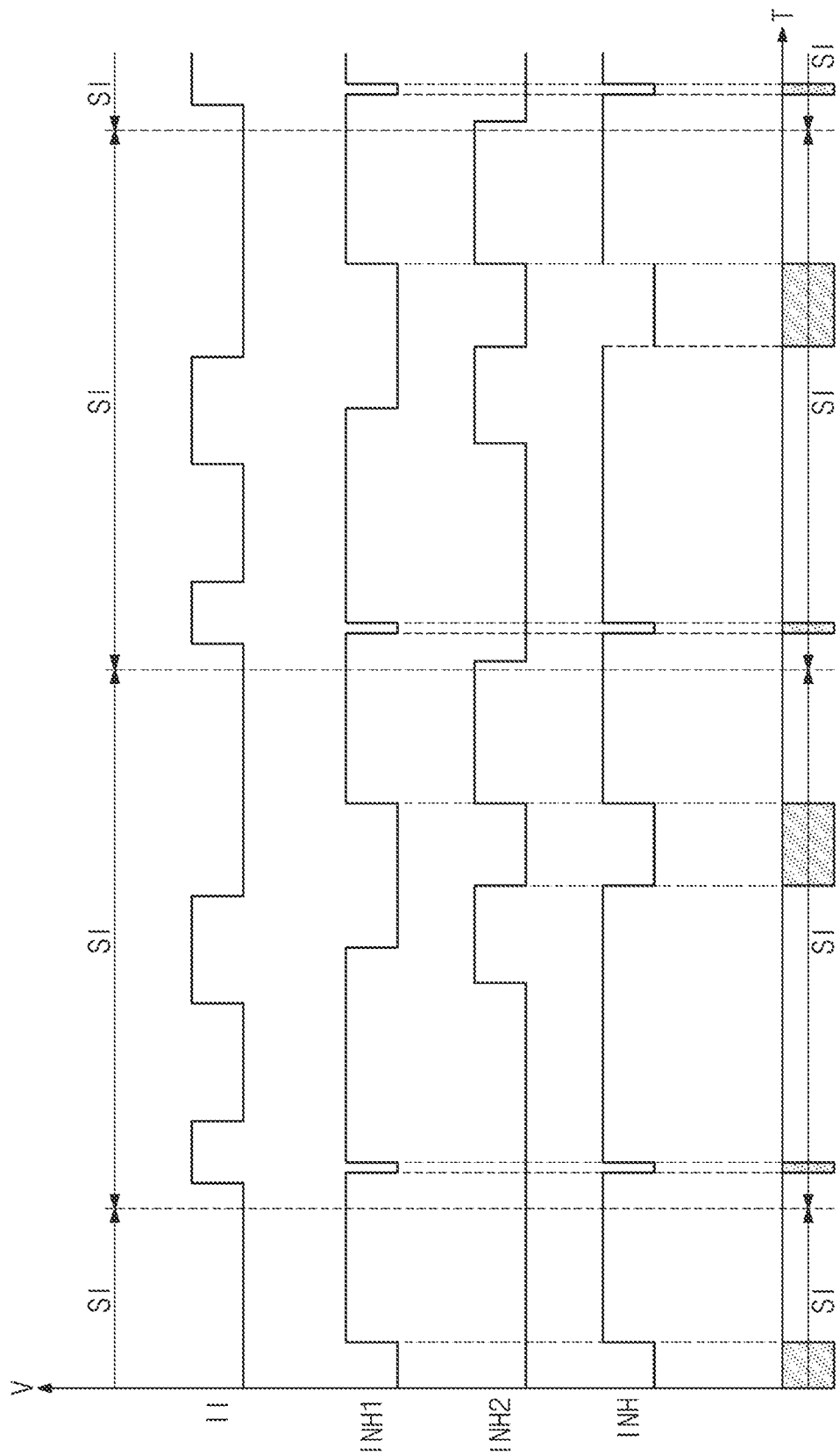
FIG. 11 illustrates an example in which an interface circuit calculates an inhibit interval based on a start of transmission and an end of transmission.

FIG. 11 illustrates an example in which the interface circuit 300 calculates an inhibit interval based on the start of transmission SoT and the end of transmission EoT. In FIG. 11, a horizontal axis represents a time "T", and a vertical axis represents a voltage "V". The interval information signal II, the first inhibit interval signal INH1, the second inhibit interval signal INH2, and an inhibit interval signal INH are illustrated in FIG. 11. The interval information signal II, the first inhibit interval signal INH1, the second inhibit interval signal INH2, and the inhibit interval signal INH are together illustrated for better understanding, but voltages of the interval information signal II, the first inhibit interval signal INH1, the second inhibit interval signal INH2, and the inhibit interval signal INH may be independent of each other.

Referring to FIGS. 1, 4, and 11, the interface circuit 300 may calculate the inhibit interval signal INH by performing an OR operation on the first inhibit interval signal INH1 and the second inhibit interval signal INH2.

In FIG. 11, the remaining intervals other than an inhibit interval that the inhibit interval signal INH indicates are marked in the form of a rectangle filled with dots. In the case where the activation of the trigger signal TRG is inhibited during the inhibit interval that the inhibit interval signal INH indicates, the interface circuit 300 may prevent/inhibit the start of transmission SoT or the end of transmission EoT from occurring in at least one interval that the interval information signal II indicates. Accordingly, noise may be prevented/suppressed from being added to the first image data ID1 or the third image data ID3.

Figure 12:
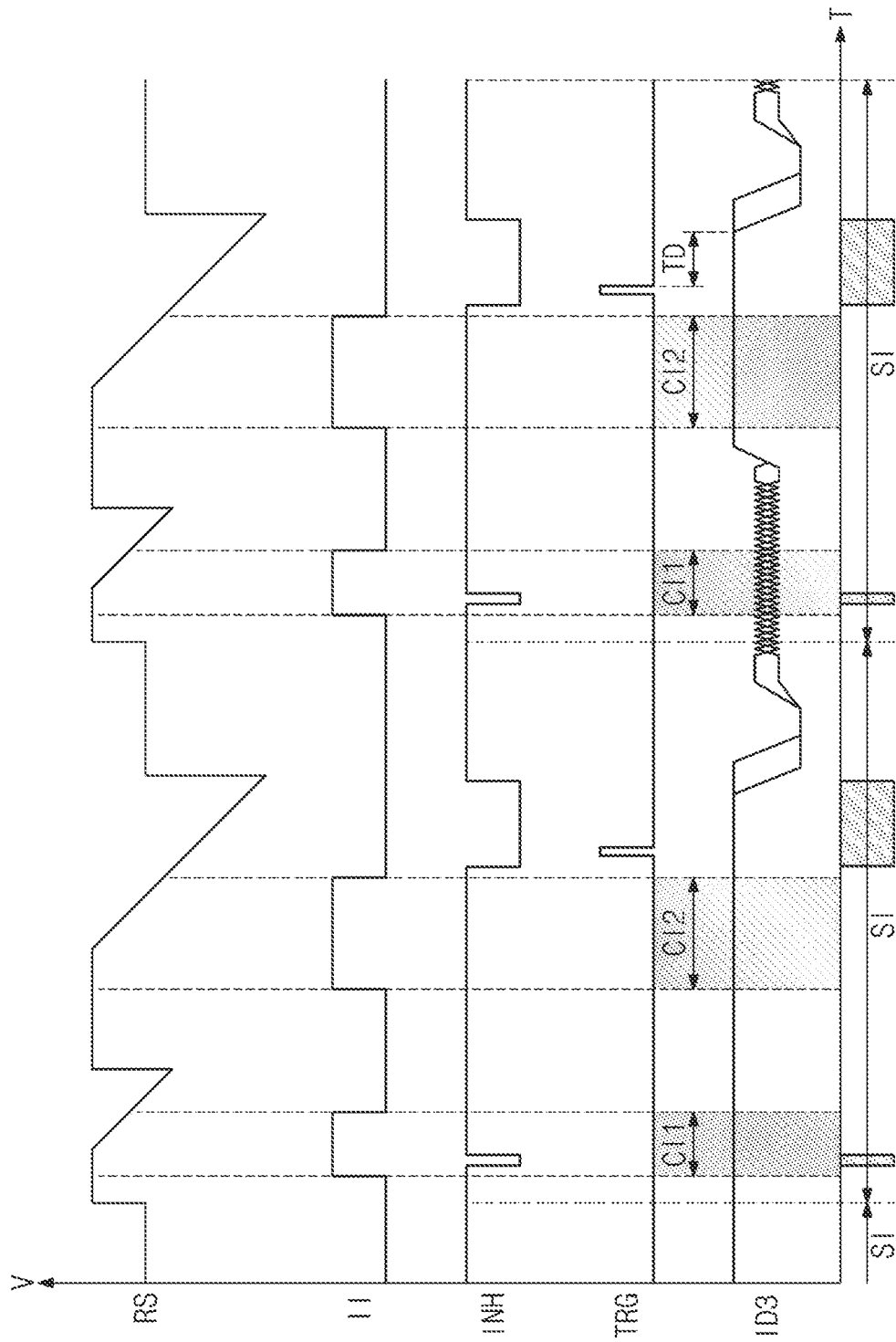
FIG. 12 illustrates an example in which an interface circuit outputs third image data based on an inhibit interval.

FIG. 12 illustrates an example in which the interface circuit 300 outputs the third image data ID3 based on an inhibit interval. In FIG. 12, a horizontal axis represents a time "T", and a vertical axis represents a voltage "V".

Referring to FIGS. 1, 4, and 12, the interface circuit 300 may activate the trigger signal TRG (e.g., may allow the trigger signal TRG to transition to the high level and the low level) in a state of being out of an inhibit signal indicated by the inhibit interval signal INH (on the basis of time). The ramp signal RS, the interval information signal II, the inhibit interval signal INH, the trigger signal TRG, and an output of the third image data ID3 are illustrated in FIG. 12. The ramp signal RS, the interval information signal II, the inhibit interval signal INH, the trigger signal TRG, and the output of the third image data ID3 are together illustrated for better understanding, but voltages of the ramp signal RS, the interval information signal II, the inhibit interval signal INH, the trigger signal TRG, and the output of the third image data ID3 may be independent of each other.

After the trigger signal TRG is activated and the transmission delay TD passes, the start of transmission SoT may occur for an output of the third image data ID3. After the start of transmission SoT occurs and the transmission time TT passes, the end of transmission EoT according to the output of the third image data ID3 may occur. As illustrated in FIG. 12 (in view of FIG. 5), the start of transmission SoT of the third image data ID3 and the end of transmission EoT of the third image data ID3 may not overlap the first critical interval CI1 and the second critical interval CI2, respectively, that the interval information signal II indicates. Rather, the start of transmission SoT may begin after the trigger signal TRG and the transmission delay TD.

Moreover, FIG. 12 shows that the interface circuit 300 may start and end output/transmission of the third image data ID3 only when the interval information signal II is at a low level/voltage (and may refrain from doing so when the interval information signal II is at a high level/voltage). Accordingly, transitions to/from the high-speed transmission mode HS (FIG. 5) may occur only when the interval information signal II is at the low level/voltage.

Figure 13:
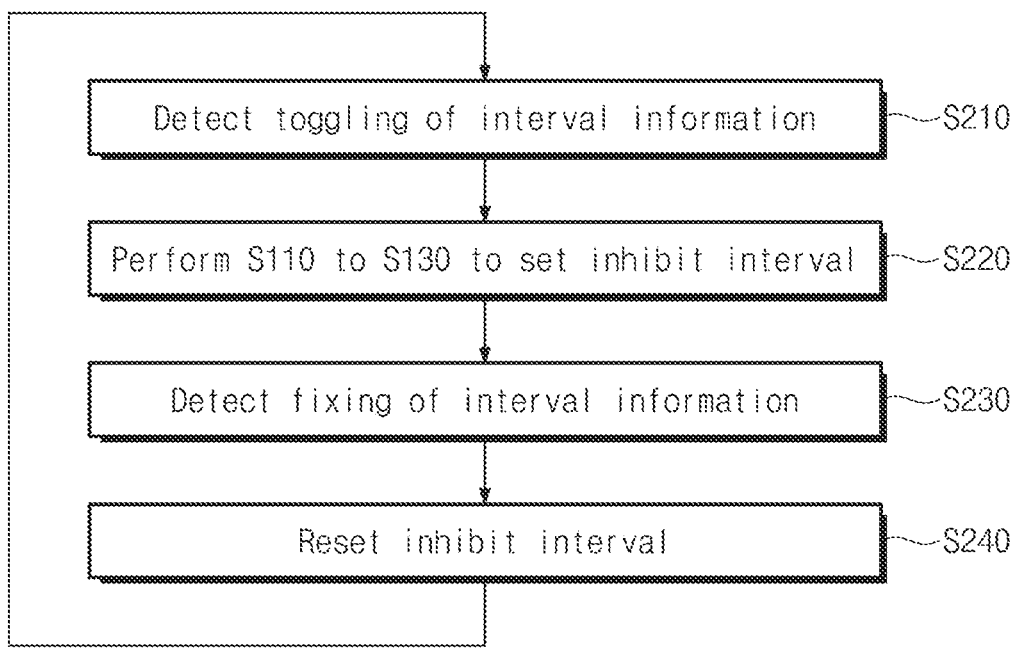
FIG. 13 illustrates an example in which a camera module sets and initializes an inhibit interval.

FIG. 13 illustrates an example in which the camera module 100 sets and initializes an inhibit interval. Referring to FIGS. 1, 4, and 13, in operation S210, the interface circuit 300 may detect toggling of the interval information signal II. As the toggling of the interval information signal II is detected, in operation S220, the interface circuit 300 may perform operation S110 to operation S130 (FIG. 7) to set an inhibit interval.

For example, while the image sensor 110 generates first image data ID1 of a first line, the image sensor 110 may toggle the interval information signal II. Before the second image data ID2 are transferred to the buffer 310, the interface circuit 300 may set the inhibit interval in response to the toggling of the interval information signal II.

While the camera module 100 consistently captures an image of a target, the image sensor 110 may periodically output the first image data ID1 in units of a line. The interface circuit 300 may trigger an output of the third image data ID3 by repeatedly using the set inhibit interval.

In an embodiment, based on the inhibit interval, a timing to activate the trigger signal TRG may be set from at least one of toggle timings of the interval information signal II. For example, the timing to activate the trigger signal TRG may be set to a delay value from at least one of the toggle timings of the interval information signal II. Because the interface circuit 300 fails to know a timing when the image sensor 110 starts sensing, the interface circuit 300 may determine the timing to activate the trigger signal TRG, based on the toggle timing of the interval information signal II.

For example, the interface circuit 300 may include a counter. The interface circuit 300 may start a count operation after a specific toggle timing of the interval information signal II and may activate the trigger signal TRG when the count value reaches the delay value. The interface circuit 300 according to an embodiment of the inventive concept is not limited to a counter. For example, the interface circuit 300 may be implemented with various means capable of activating the trigger signal TRG at a time when a delay is made as much as the delay value from the specific toggle (or transition) timing of the interval information signal II.

In operation S230, the interface circuit 300 may detect fixing of the interval information signal II. For example, when the camera module 100 does not capture an image of a target, the interval information signal II may be fixed without toggling. In operation S240, the interface circuit 300 may reset the set inhibit interval when the interval information signal II is fixed (i.e., at a constant level without transitioning) during a predetermined threshold time or longer. For example, the threshold time may be determined depending on a time length of the sensing interval SI, like a time corresponding to one sensing interval SI, a time corresponding to half the sensing interval SI, or a time corresponding to k times the sensing interval SI (k being a positive integer).

Afterwards, when the camera module 100 resumes capturing a target image at any time, the interface circuit 300 may again set an inhibit interval in operation S210 and operation S220.

Figure 14:
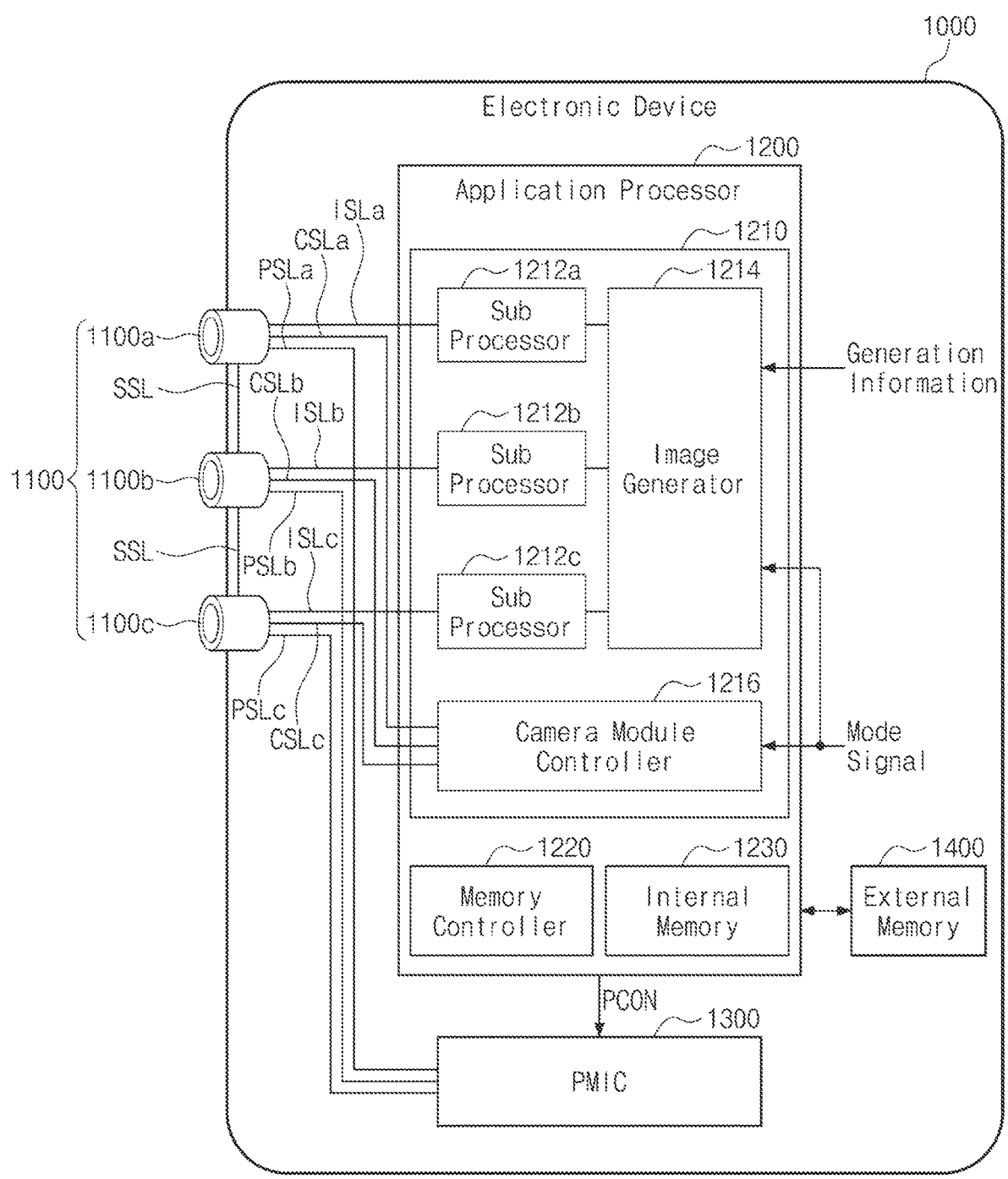
FIG. 14 is a block diagram of an electronic device including a multi-camera module.
Figure 15:
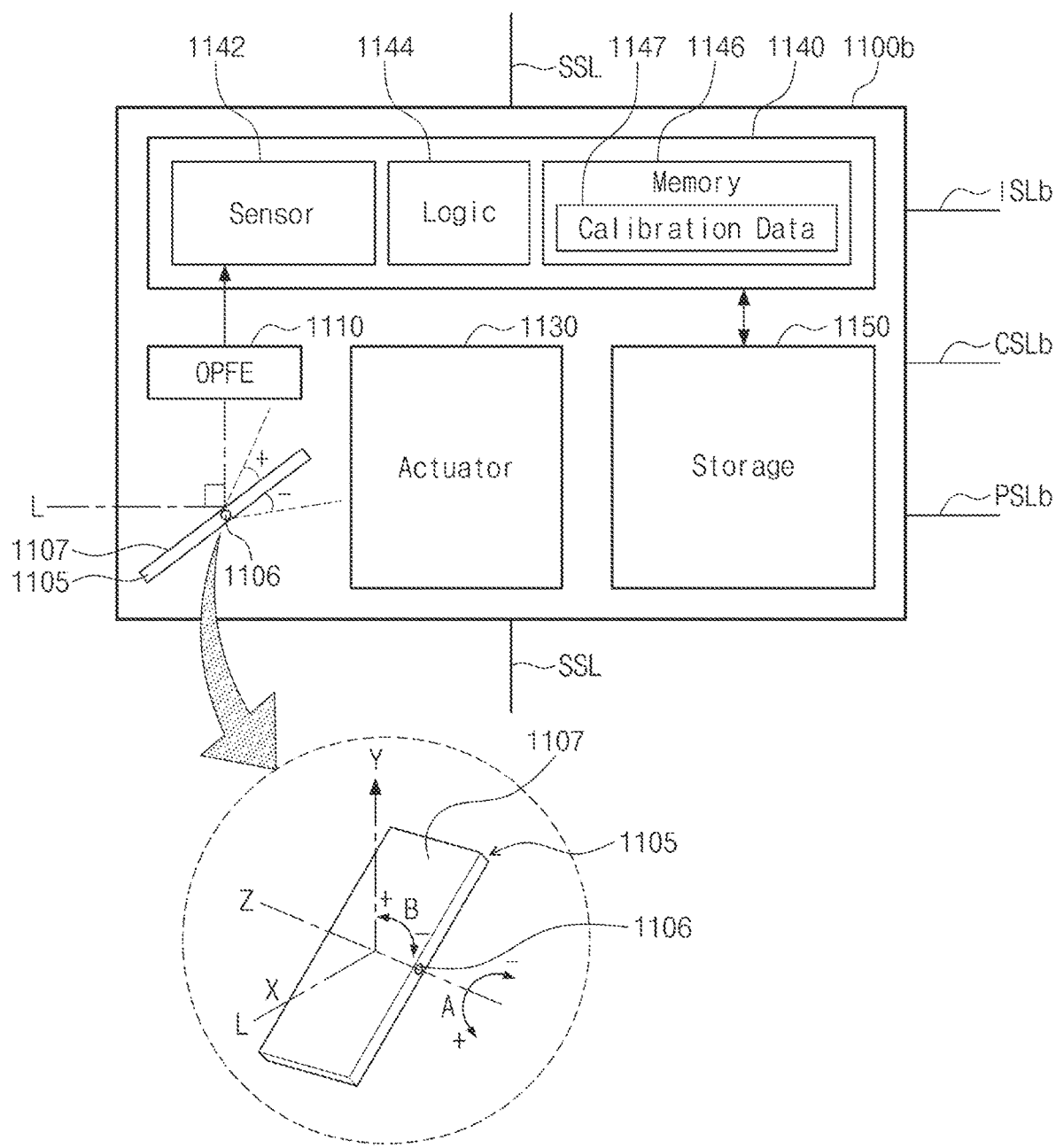
FIG. 15 is a detailed block diagram of a camera module of FIG. 14.

FIG. 14 is a block diagram of an electronic device including a multi-camera module. FIG. 15 is a detailed block diagram of a camera module of FIG. 14.

Referring to FIG. 14, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An embodiment in which three camera modules 1100a, 1100b, and 1100c are disposed is illustrated in FIG. 14, but embodiments are not limited thereto. In some embodiments, the camera module group 1100 may be modified to include only two camera modules. Also, in some embodiments, the camera module group 1100 may be modified to include "n" camera modules (n being a natural number of 4 or more). In an embodiment, each of the plurality of camera modules 1100a, 1100b, and 1100c of the camera module group 1100 may include the camera module 100 of FIG. 1.

Below, a detailed configuration of the camera module 1100b will be more fully described with reference to FIG. 15, but the following description may be equally applied to the remaining camera modules 1100a and 1100c.

Referring to FIG. 15, the camera module 1100b may include a prism 1105, an optical path folding element (OPFE) 1110, an actuator 1130, an image sensing device 1140, and a storage unit 1150.

The prism 1105 may include a reflecting plane 1107 of a light reflecting material and may change a path of light "L" incident from outside of the camera module 1100b.

In some embodiments, the prism 1105 may change a path of the light "L" incident in a first direction "X" to a second direction "Y" perpendicular to the first direction "X." Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some embodiments, as illustrated, a maximum rotation angle of the prism 1105 in direction "A" may be equal to or smaller than 15 degrees in a positive A direction and may be greater than 15 degrees in a negative A direction, but embodiments are not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lenses may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 7Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include an image sensor 1142, control logic 1144, and a memory 1146. The image sensor 1142 may sense an image of a sensing target by using the light "L" provided through an optical lens. The image sensing device 1140 may correspond to the image sensor 110 of FIG. 1. In an embodiment, the image signal processor 120 and the interface circuit 300 are omitted in FIG. 15 to prevent a drawing from being unnecessarily complicated.

The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from outside of the camera module 1100b. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage unit 1150 may store image data sensed through the image sensor 1142. The storage unit 1150 may be disposed outside the image sensing device 1140 and may be implemented in a shape where the storage unit 1150 and a sensor chip constituting the image sensing device 1140 are stacked. In some embodiments, the storage unit 1150 may be implemented with an electrically erasable programmable read only memory (EEPROM), but embodiments are not limited thereto.

Referring to FIGS. 14 and 15 together, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments are not limited thereto.

In some embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lenses, but are not limited thereto.

Also, in some embodiments, fields of view of the plurality of camera modules 1100a, 1100b, and 1100c may be different. In this case, the plurality of camera modules 1100a, 1100b, and 1100c may include different optical lenses, but are not limited thereto.

In some embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 14, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not limited thereto.

Meanwhile, in some embodiments, one sub image processor may be disposed to correspond to a plurality of camera modules. For example, the sub image processor 1212a and the sub image processor 1212c may be integrally implemented, not separated from each other as illustrated in FIG. 14; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on generation information (or image generation information) or a mode signal.

In detail, the image generator 1214 may generate the output image by merging at least a portion of the image data respectively generated from the camera modules 1100a, 1100b, and 1100c having different fields of view, depending on the generation information or the mode signal. Also, the image generator 1214 may generate the output image by selecting one of the image data respectively generated from the camera modules 1100a, 1100b, and 1100c having different fields of view, depending on the generation information or the mode signal.

In some embodiments, the generation information may include a zoom signal or a zoom factor. Also, in some embodiments, the mode signal may be, for example, a signal based on a mode selected from a user.

In the case where the generation information is the zoom signal (or zoom factor) and the camera modules 1100a, 1100b, and 1100c have different visual fields (or fields of view), the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, embodiments are not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated (using designation information) as a master camera (e.g., 1100b) depending on the generation information including a zoom signal or the mode signal, and the remaining camera modules (e.g., 1100a and 1100c) may be designated (using designation information) as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with the sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and/or a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply power, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Power levels respectively provided to the plurality of camera modules 1100a, 1100b, and 1100c may be identical to each other or may be different from each other. Also, a power level may be dynamically changed.

In the above embodiments, components according to the inventive concept are described by using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

In the above embodiments, components according to embodiments of the inventive concept are described by using blocks. The blocks may be implemented with various hardware devices, such as an integrated circuit (IC), an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to the inventive concept, an interface circuit of a camera module is configured to start and end an output of image data in a state of being out of a inhibit interval on time determined by an image sensor. Accordingly, a camera module that prevents/suppresses a peak current coming from the interface circuit from influencing image data and generates image data of an improved quality, an operating method of the camera module, and an electronic device including the camera module are provided.

While the inventive concept has been described with reference to example embodiments thereof, it will be apparent to those of ordinary skill in the art that various changes and modifications may be made thereto without departing from the scope of the inventive concept as set forth in the following claims.

What is claimed is:

1. A camera module comprising:
    an image sensor configured to capture an image of a target to generate first image data, to output the first image data, and to output an interval information signal;
    an image signal processor configured to receive the first image data, to perform image processing on the first image data to generate second image data, and to output the second image data; and
    an interface circuit configured to receive the second image data and the interval information signal and to output the second image data as third image data,
    wherein the interface circuit is further configured to adjust a timing to output the third image data, based on the interval information signal.

2. The camera module of claim 1, wherein the interval information signal includes information about at least one interval in which noise is added to the first image data due to a peak current of the interface circuit.

3. The camera module of claim 1, wherein the image sensor includes:
    a ramp signal generator configured to generate a ramp signal continuously decreasing during a specific interval, and
    wherein the interval information signal includes information about at least a portion of the specific interval.

4. The camera module of claim 1, wherein the interface circuit is further configured to:
    output the third image data through a low-speed transmission interval, a transmission start interval, a high-speed transmission interval, and a transmission end interval.

5. The camera module of claim 4, wherein the interface circuit adjusts the timing to output the third image data such that the transmission start interval does not overlap at least one interval indicated by the interval information signal.

6. The camera module of claim 5, wherein the interface circuit enters the high-speed transmission interval through the transmission start interval in response to a trigger signal and outputs the third image data in the high-speed transmission interval,
    wherein the interface circuit is further configured to inhibit the trigger signal during a specific interval, and
    wherein the specific interval has timings that are advanced with respect to the at least one interval as much as a transmission delay necessary for the interface circuit to start to output the third image data in response to the trigger signal and such that the advanced specific interval is extended to be advanced as much as a time length of the transmission start interval.

7. The camera module of claim 4, wherein the interface circuit adjusts the timing to output the third image data such that the transmission end interval does not overlap at least one interval indicated by the interval information signal.

8. The camera module of claim 7, wherein the interface circuit enters the high-speed transmission interval through the transmission start interval in response to a trigger signal, outputs the third image data in the high-speed transmission interval, and enters the transmission end interval after outputting the third image data,
    wherein the interface circuit is further configured to inhibit the trigger signal during a specific interval, and
    wherein the specific interval has timings that are delayed with respect to the at least one interval as much as a time length of the high-speed transmission interval and such that the delayed specific interval is extended to be delayed as much as a time length of the transmission end interval.

9. The camera module of claim 4, wherein the interface circuit adjusts the timing to output the third image data such that the transmission start interval and the transmission end interval do not overlap at least one interval indicated by the interval information signal.

10. The camera module of claim 1, wherein the interface circuit is configured to adjust the timing in response to detecting transitions of the interval information signal to a high level and a low level.

11. The camera module of claim 1, wherein the interface circuit is configured to reset the timing in response to detecting that the interval information signal is at a constant level during a threshold time or longer.

12. The camera module of claim 11, wherein the threshold time depends on a time when the image sensor scans one row of pixels of the image sensor.

13. The camera module of claim 1, wherein the interface circuit includes:
    a buffer configured to store the second image data;
    a state machine configured to activate a trigger signal while outside of an inhibit interval defined based on the interval information signal, when the second image data are stored in the buffer;
    a physical circuit configured to convert the second image data to the third image data in response to the trigger signal; and
    a transmitter configured to output the third image data.

14. The camera module of claim 1,
    wherein the interval information signal comprises a high level and a low level thereof, and
    wherein the interface circuit starts and ends output of the third image data only when the interval information signal is at the low level.

15. An operating method of a camera module, the method comprising:
    generating first image data by capturing an image of a target by using an image sensor of the camera module;
    outputting from the image sensor an interval information signal that identifies inhibit intervals;
    generating second image data by performing image processing on the first image data;
    starting to output the second image data as third image data while outside of the inhibit intervals; and
    ending an output of the third image data while outside of the inhibit intervals.

16. The method of claim 15, wherein the generating of the first image data further includes:
    converting an amount of incident light to an amount of voltage by using pixels of the image sensor;

generating a ramp signal comprising a portion that monotonically decreases or increases;
converting the amount of voltage to digital data by using the ramp signal; and
outputting the digital data as the first image data,
wherein the inhibit intervals overlap with at least some of the portion of the ramp signal.

17. The method of claim 15, wherein the starting to output the second image data as the third image data includes switching from a low-power mode to a high-speed transmission mode, and
wherein the ending of the output of the third image data includes switching from the high-speed transmission mode to the low-power mode.

18. The method of claim 17, wherein an equal amount of data is output in each of a plurality of instances of the high-speed transmission mode.

19. An electronic device comprising:
a camera module group including two or more camera modules that are each configured to capture an image of a target to generate image data;
an application processor configured to independently control the two or more camera modules of the camera module group and to receive the image data from each of the two or more camera modules; and
a power management integrated circuit configured to supply power to the two or more camera modules of the camera module group in response to a control signal from the application processor,
wherein each of the two or more camera modules includes:
an image sensor configured to capture the image of the target to generate first image data, to output the first image data, and to output an interval information signal;
an image signal processor configured to receive the first image data, to perform image processing on the first image data to generate second image data, and to output the second image data; and
an interface circuit configured to receive the second image data and the interval information signal and to output the second image data as the image data,
wherein the interface circuit is further configured to adjust a timing to output the image data, based on the interval information signal.

20. The electronic device of claim 19, wherein the interface circuit is further configured to:
start an output of the image data in while outside of at least one time interval that the interval information signal indicates; and
end the output of the image data.

* * * * *